Feb. 24, 1970 A. W. BARBER 3,497,717

ANALOG DEVICE FOR MULTIPLYING/DIVIDING USING PHOTOCONDUCTIVE MEANS

Original Filed May 9, 1966 2 Sheets-Sheet 1

INVENTOR.

Alfred W. Barber

Feb. 24, 1970 A. W. BARBER 3,497,717

ANALOG DEVICE FOR MULTIPLYING/DIVIDING USING PHOTOCONDUCTIVE MEANS

Original Filed May 9, 1966 2 Sheets-Sheet 2

INVENTOR.

Alfred W. Barber

United States Patent Office 3,497,717

Patented Feb. 24, 1970

3,497,717
ANALOG DEVICE FOR MULTIPLYING/DIVIDING USING PHOTOCONDUCTIVE MEANS

Alfred W. Barber, 32—44 Francis Lewis Blvd., Bayside, N.Y. 11358

Continuation of application Ser. No. 548,683, May 9, 1966. This application Sept. 29, 1966, Ser. No. 583,045
Int. Cl. G06g 7/12
U.S. Cl. 307—229 12 Claims

ABSTRACT OF THE DISCLOSURE

An "operational amplifier" is programmed by an input voltage and drives a lamp through unidirectional conductive means connected to its output. A photoconductive cell optically coupled to the lamp is connected in a conductive path betwen the output and inverting input of the amplifier so that a portion of the output voltage of the amplifier produces a degenerative current to the input. In this manner the resistance of the photoconductive cell is substantially inversely proportional to the magnitude of the programmed input voltage and the amplifier is stabilized. One or more additional photoconductive cells optically coupled to the lamp and receiving substantially equal light to the light received by the first cell are also programmed inversely proportional to the input voltage. These additional photoconductive cells call free from any voltages are used in various combinations as programmed resistors with one or more additional operational amplifiers as input or feedback programming resistors for adding, subtracting, multiplying, dividing, differentiating, integrating, deriving a root or raising to a power.

The present invention concerns analog computers and, in particular, methods of and means for performing multiplication, division, raising to a power and deriving roots in such computers electronically.

The present application is a continuation of the application filed on May 9, 1966 entitled "Analog Multiplying/Dividing Systems" and bearing Ser. No. 548,683, now abandoned.

Computers have a long history. However, it is only within the past 20 years or so that electrical and finally electronic devices have become important in this field. Computers can be defined as devices which perform various mathematical calculations when provided with input data and which process this data in accordance with instructions to provide an answer or output. The components of computers are devices which add, substract, multiply, divide, differentiate and integrate.

A most useful electronic device has been developed which readily adds, substracts, differentiates or integrates depending on the input data and externally connected impedance. This device is the operational amplifier, so called, because of its primary use as an operational component of computers. In its basic form; the operational amplifier has a frequency response extending to DC; a very high stable gain; an input connection and an output connection. The output appears out-of-phase with the input so that feedback circuits connected from the output to the input degenerate the effective gain. If an input voltage $E_1$ is connected through a resistance $R_1$ to the input terminal, and a feedback resistor $R_F$ is connected from the output terminal to the same input terminal, the gain of the circuit i.e. $E_0/E_1$ will be substantially equal to $R_F/R_1$. This circuit is thus an amplifier having a predetermined gain or scaling factor. If a second voltage $E_2$ is connected through a second resistor $R_2=R_1$ to the input, the output voltage will be $E_1+E_2$ multiplied by the gain or scaling factor. Thus, the circuit scales and adds. If the polarity of $E_2$ is reversed, it is substracted so that $E_0$ is equal to $E_1-E_2$ times the scaling factor.

The operational amplifier becomes an integrator if the feedback impedance is a capacitor and it differentiates if a capacitor is connected in series with the input voltage.

However, no simple way has yet been devised to provide multiplication i.e. $E_1 \times E_2$ by means of the operational amplifier. I have discovered a simple and effective method and means for performing multiplication utilizing operational amplifiers. The basic formula as described above is $E_0=E_1R_F/R_1$. This indicates that $E_1$ is multiplied by $R_F/R_1$ or $R_F=KR_1$, if multiplied by K. Now if $R_1$ or $R_F$ can be made proportional to a second voltage $E_2$ so that $E_0=KE_1 \times CE_2$ where C is the proportionality factor, the system will multiply, or if the factor is $C/E_2$ it will divide by $E_2$. I have discovered just such a device, i.e. one which provides a resistance equal to $C/E_2$. If this resisance wihch is equal to a constant times the inverse of the input is placed in series with an input voltage, the circuit multiplies. If it is used as a feedback resistor, the circuit divides.

I provide this resistance proportional to the inverse of the input voltage by means of two photoconductive cells. A first operational amplifier is connected to an output load comprising an incandescent lamp. A photoconductive cell receiving light from this lamp is connected as a feedback resistor from the output to the input of the operational amplifier. I have found that if an input voltage is connected through a resistor to the input of this amplifier, the resistance of the photoconductive cell will be substantially proportional to $1/E_1$ where $E_1$ is this input voltage. In order to make this inverse resistance available for multiplying or dividing, I provide a second similar photoconductive cell receiving light from the incandescent lamp. Obviously if the two photoconductive cells are similar and receive a similarly varying light from the lamp they will vary in the same way. This second photoconductive cell is now used in series with the input of a second operational amplifier to perform multiplication or as a feedback resistor to perform division on the input voltage to the second amplifier.

The present invention concerns improvements in the particular mode of connection and drive of the cells. I have found that driving the lamp by placing in the collector circuit of a transistor the input of which is connected to the output of an operational amplifier and the feedback cell connection and the emitter of which is returned through a degenerative resistor that the linearity stability and other characteristics of the device are substantially improved.

Accordingly one purpose of the present invention is to provide methods of and means for performing analog multiplication and division utilizing operational amplifiers and a lamp driving transistor.

A further object is to use the variable resistance characteristics of photo-conductive cells in multiplying and dividing circuits in conjunction with operational amplifiers, and a transistor drive in a circuit of improved linearity, stability and power handling capability.

Another object is to "bound" the light and resistance excursions in order to minimize the effects of "history" on the cell performance.

These and other objects will be apparent from the detailed description of the invention given in connection with the various figures of the drawing.

Figure 1:
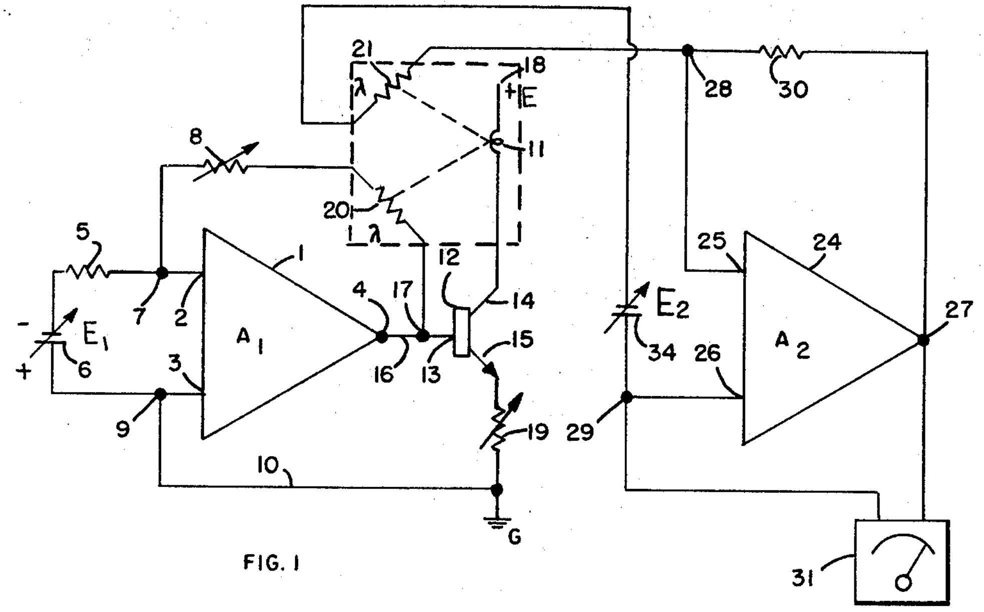
FIGURE 1 is a schematic and diagrammatic representation of the present invention as a multiplying device.

FIGURE 1 shows an operational amplifier 1 having an input terminal 2, a common terminal 3 and an output terminal 4. An input voltage 6 is connected from common terminal 3 through an input resistance 5 to input terminal 2. The output of this amplifier provides current to lamp 11 which is connected in series between collector 14 of transistor 12 and a source of positive bias at lead 18. Common terminal 3 is connected to ground G at junction 9 over lead 10. A power boosting stage is provided in the form of power transistor 12 having base 13 connected to amplifier output 4 over lead 16, collector 14 connected to a suitable source of positive bias, not shown through lamp 11, and emitter 15 returned to ground G through emitter resistor 19. A photoconductive cell 20 is positioned to be illuminated by lamp 11 and is connected as a feedback impedance. Photoconductive cell 20 is connected to the junction between amplifier output 4 and base 13 at 17 is returned to input terminal 2 at junction 7. I have found in certain cases that the addition of a resistor 8 in series with the photoconductive cell provides a more nearly exact inverse proportionality of cell resistance to input voltage. It will be understood throughout that all polarities may be reversed and PNP in place of NPN transistors may be used without departing from the spirit of the invention.

With the circuit of FIGURE 1 so far described, I have found that the resistance of photo-conductive cell 20 varies as $1/E_1$ as $E_1$ is varied. To make this inverse resistance $R=K/E_1$ available for multiplication purposes, I provide a second photoconductive cell 21 positioned to receive light from lamp 11. If cell 21 is similar to cell 20 and is positioned to receive an equal amount of light from lamp 11, it will have a resistance at all times substantially equal to the resistance of cell 20 and hence also equal to $K/E_1$.

To complete the multiplying circuit I provide a second operational amplifier 24 having an input terminal 25, a common terminal 26 and an output terminal 27. A second input voltage 34 ($E_2$) is connected from common terminal 26 to one side of photoconductive cell 21. The other side of cell 21 is connected to input terminal 25. A feedback resistor 30 is connected from output terminal 27 to input terminal 25 at junction 28. A suitable output device such as voltmeter 31 is connected from output terminal 27 to common terminal 26 at junction 29. I have found that this output meter 31 reads accurately a voltage proportional to the product of the two input voltages $E_1$ and $E_2$ i.e. proportional to $E_1 \times E_2$. Lamp 11 and cells 20 and 21 are enclosed in a light-tight enclosure to shield the conversion circuit from influences of ambient or extraneous light.

Figure 2:
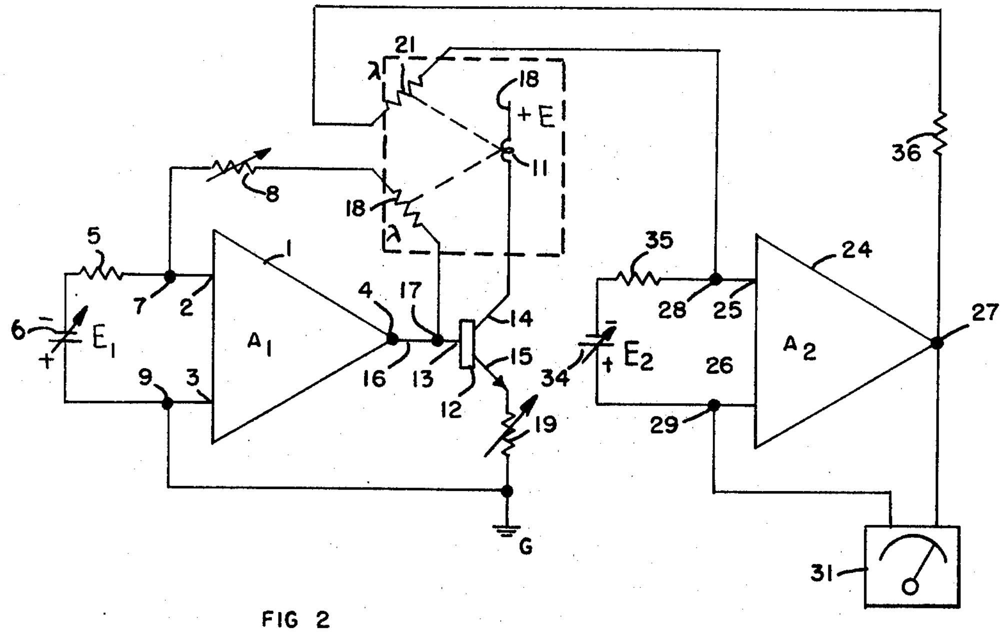
FIGURE 2 is a schematic and diagrammatic representation of the present invention as a dividing device.

FIGURE 2 shows how a simple change in the circuit of FIGURE 1 provides a circuit which divides rather than multiplies. Here the second cell 21 is placed in the feedback path of the second operational amplifier with one side going to output terminal 27 and the other side going to input 25 at junction point 28. Resistor 36 may be included in series with cell 21 to improve linearity and range. The input voltage 34 ($E_2$) is connected from common terminal 26 through input resistor 35 to input terminal 25. I have found that this circuit provides an output at terminal 27 as read on meter 31 which is proportional to $E_2$ divided by $E_1$ or $E_0=KE_2/E_1$ since the resistance of cell 21 is inversely proportional to $E_1$ the second input voltage is multiplied by $K/E_1$ which is the same as dividing by $E_1$.

Figure 3:
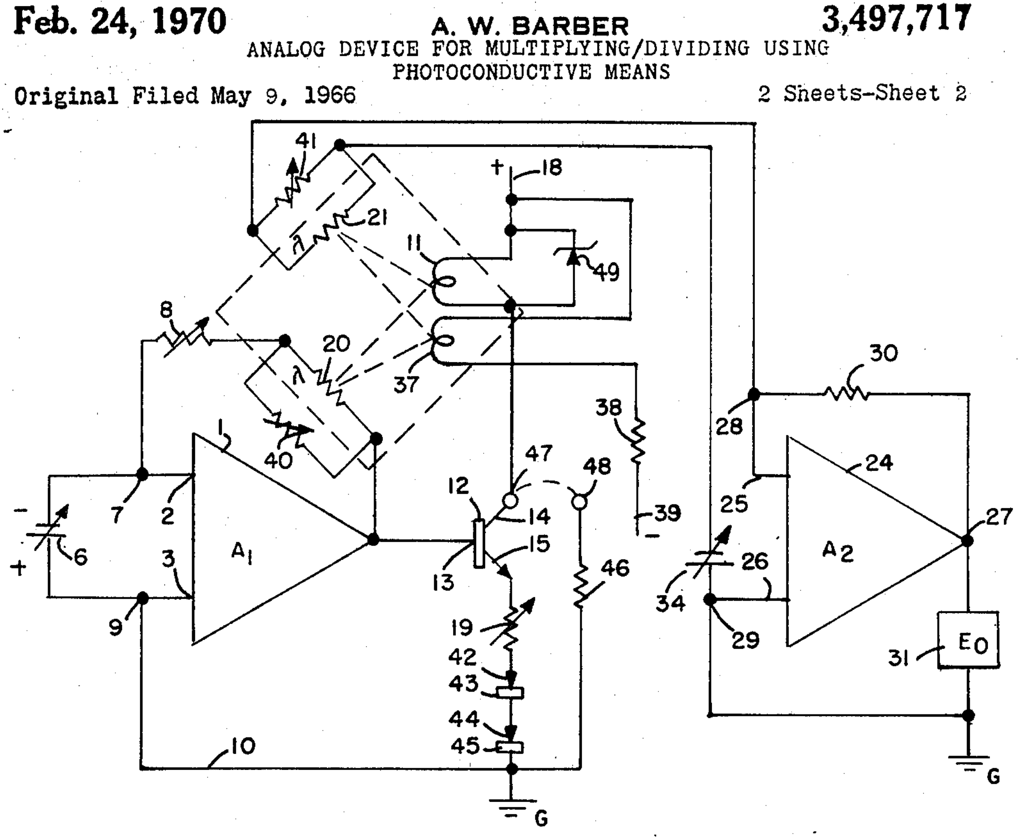
FIGURE 3 is a modification applicable to either FIGURE 1 or FIGURE 2 but here shown particularly in a multiplying circuit.

FIGURE 3 is a modification of the present invention including means for limiting the range of light applied to the cells in order to improve their programming accuracy which is affected by their "history." In order to limit the maximum light which can be programmed a Zener diode 49 is connected across lamp 11 thereby limiting its maximum terminal voltage to the Zener regulating voltage. The minimum light value to which the cells can be exposed may be set by a second lamp 37 connected in series with a current limiting resistor 38 and from positive voltage source at 18 to a suitable negative voltage point at 39. This lamp is adjusted by means of its applied voltage and series resistor to supply a steady light to cells 20 and 21 to prevent "dark" condition of the cells which affects their programmed resistance. This light may be chosen, for example, to be of the order of one half the minimum of the programmed light from lamp 11. The effect of this minimum light on the cell resistance characteristic may be off-set by means of resistors 40 and 41 connected in shunt with cells 20 and 21 respectively.

Figure 4:
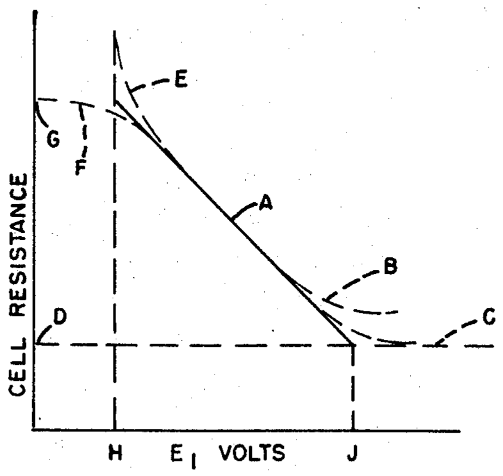
FIGURE 4 is a set of curves useful in explaining the operation of the invention.

These light bounding means may be more clearly understood by referring to the curves of FIGURE 4. Curve A represents an ideal linear relationship between cell resistance and $1/E_1$. Line C at cell resistance D represents the maximum light and minimum cell resistance set by Zener 49 (FIG. 3). The fact that base 13 of transistor 12 requires an increasing voltage causes cell resistance to follow curve B. However, curve B may be restored to follow A by a proper choice of resistance 8. The ambient light from lamp 37 causes the upper end of cell resistance to fall off along curve F. This effect may be effectively compensated by the shunt resistors 40 and 41 which in themselves would cause cell resistance to follow curve E but when combined with F returns the cell plus shunt resistance to curve A. Cell resistance G represents the maximum program effective resistance. Lines H and J represent respectively the minimum and maximum values of input voltage $E_1$ assumed for the above discussion of curve A.

Returning to FIGURE 3 adjustable emitter resistor 19 provides means for setting the initial conditions of voltage at base 13. The addition of one or more diodes or rectifiers 42–43, 44–45 in series with resistor 19 provides additional means for this voltage setting. These diodes have the ability to change the voltage level required at base 13 with a minimum of effect on the sensitivity of the transistor-lamp drive.

FIGURE 3 also shows an alternate method of limiting the minimum light to which the cells are subjected in the system. This means includes a resistor 46 which may be connected by closing a link from 47 to 48 whereby a minimum current is passed through lamp 11 regardless of the programming range of transistor 12.

While transistor 12 has been shown and described as an NPN transistor, other types such as PNP field effect or transistors which are equivalent for the purpose may be used to drive the source of illumination by appropriate choice of the circuit constants such as the operational amplifier and the polarity of the bias voltages.

While only a few forms of the present invention have been shown and described, many variations will be apparent to those skilled in the art and within the spirit and scope of the invention as set forth, in particular, in the appended claims.

What is claimed is:

1. In a system for programming a resistor inversely in accordance with a variable voltage, the combination of:
   - an operational amplifier including an inverting input terminal, a common terminal, and an output terminal,
   - a lamp,
   - unilateral conductive means connected between said output teminal and said lamp for energizing said lamp,
   - a first light sensitive resistive means optically coupled to said lamp, a second light sensitive resistive means optically coupled to said lamp,
a source of programmable input voltage,
resistive means coupling said input voltage to said input terminal,
conductive circuit means directly conductively connecting said first resistive means between said output terminal and said input terminal for determining the programming of said resistive means inversely in accordance with said input voltage,
means for using the programmed resistance of said second resistive means including a second operational amplifier directly conductively connected to said second resistive means, whereby said second resistive means is programmed to exhibit a resistance substantially inversely proportional to said input voltage and said second operational amplifier is adapted to solely utilized this programmed resistance.

2. A resistance programming system as set forth in claim 1 wherein said conductive circuit means for connecting said first resistive means between said output terminal and said input terminal includes a resistor for compensating the characteristics of said unilateral conductive means at the output of said first operational amplifier.

3. A resistance programming system as set forth in claim 1 and including a source of substantially constant illumination optically coupled to the two said light sensitive resistive means for limiting the minimum illumination to which said light sensitive resistive means may be subjected during the programming.

4. A resistance programming system as set forth in claim 1 and including means for limiting the maximum illumination level of said source of illumination.

5. A resistance programming system as set forth in claim 1 and including means for limiting the maximum resistance of said light sensitive resistive means.

6. A resistance programming system as set forth in claim 1;
wherein said conductive circuit is a degenerative feedback circuit.

7. A resistance programming system as set forth in claim 1;
wherein said conductive circuit is directly electrically connected between said output terminal and said input terminal.

8. A resistance programming system as set forth in claim 1;
wherein said coupling of said source of voltage to said input terminal comprises a fixed resistor.

9. In a resistance programming system, the combination of:
an operational amplifier including an inverting input terminal, an output terminal and a common terminal;
an electric lamp;
unipolar coupling means coupling said lamp to said output terminal;

two photoconductive means optically coupled to said lamp;
a source of programming voltage coupled to said input terminal;
a conductive circuit including one of said photoconductive means conductively connected between said output terminal and said input terminal;
whereby both of said photoconductive means are programmed substantially inversely proportional to the magnitude of said voltage.

10. In a resistance programming system, the combination of:
a unipolar operational amplifier including an inverting input terminal, an output terminal and a common terminal;
an electric lamp;
coupling means connected between said output terminal and said lamp for energizing said lamp;
two photoconductive means optically coupled in substantially equal manner to said lamp;
a source of programming voltage coupled to said input terminal;
a conductive degenerative feedback circuit including one of said photoconductive means in series connected between said output terminal and said input terminal;
whereby both of said photo-conductive means are programmed substantially inversely proportional to the magnitude of said voltage.

11. A resistance programming system as set forth in claim 9;
and an additional operational amplifier operatively connected in circuit with the second of said photoconductive means for performing a function depending on said inverse voltage programmed resistance of the latter said photoconductive means.

12. A resistance programming system as set forth in claim 9;
and means for utilizing the inverse voltage programmed resistance of the second of said photoconductive means.

References Cited

UNITED STATES PATENTS

| | | | |
|---|---|---|---|
| 3,082,381 | 3/1963 | Morrill et al. | 235—194 |
| 3,058,662 | 10/1962 | Whitesell | 235—194 |
| 3,070,306 | 12/1962 | DuBois | 235—194 |
| 3,172,032 | 3/1965 | Hunt | 235—194 |
| 3,193,672 | 7/1965 | Azgapetian | 235—194 |
| 3,384,739 | 5/1968 | Connelly | 235—194 |

DONALD D. FORRER, Primary Examiner

H. A. DIXON, Assistant Examiner

U.S. Cl. X.R.

235—194; 307—311; 330—59